United States Patent [19]

Williams

[11] 3,835,625

[45] Sept. 17, 1974

[54] POLLUTION-REDUCING FLOATING EXHAUST

[76] Inventor: Cecil E. Williams, 334 Awini Pl., Honolulu, Hawaii 96825

[22] Filed: July 20, 1973

[21] Appl. No.: 381,260

[52] U.S. Cl.................. 55/259, 55/385, 55/DIG. 30, 98/58, 110/119, 110/184, 114/187
[51] Int. Cl............................................ B01d 47/06
[58] Field of Search ............ 55/220, 259, 385, 310, 55/DIG. 30; 110/119, 184; 114/187; 98/58–60

[56] References Cited
UNITED STATES PATENTS

| | | | |
|---|---|---|---|
| 2,885,988 | 5/1959 | Myers | 114/235 R |
| 3,242,893 | 3/1966 | Mortarino | 114/187 |
| 3,489,072 | 1/1970 | Secor | 110/184 |
| 3,701,235 | 10/1972 | Issacson | 55/220 |
| 3,740,930 | 6/1973 | Cullom | 98/60 |

*Primary Examiner*—Bernard Nozick
*Attorney, Agent, or Firm*—Brenner & Wray

[57] ABSTRACT

An articulated floating exhaust stack trails behind a ship to cool exhaust and to remove particulate matter. Exhaust flows through a universal joint to multiple articulated sections and contacts water along the bases of the trailing sections. Water sprays within the sections cool and wash the gases. Baffles slow and lengthen flow. Waves clean channels, baffles, and filters.

14 Claims, 7 Drawing Figures

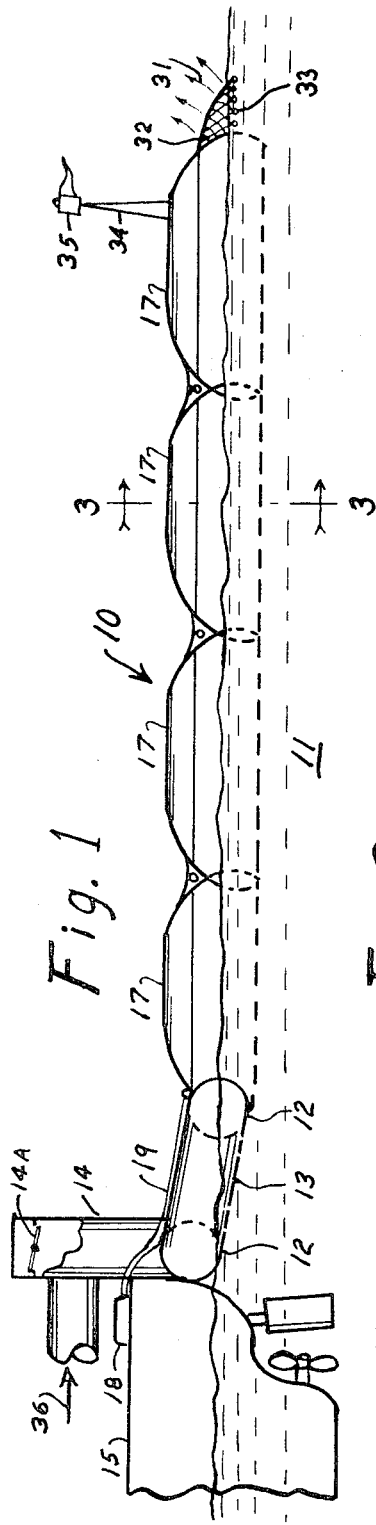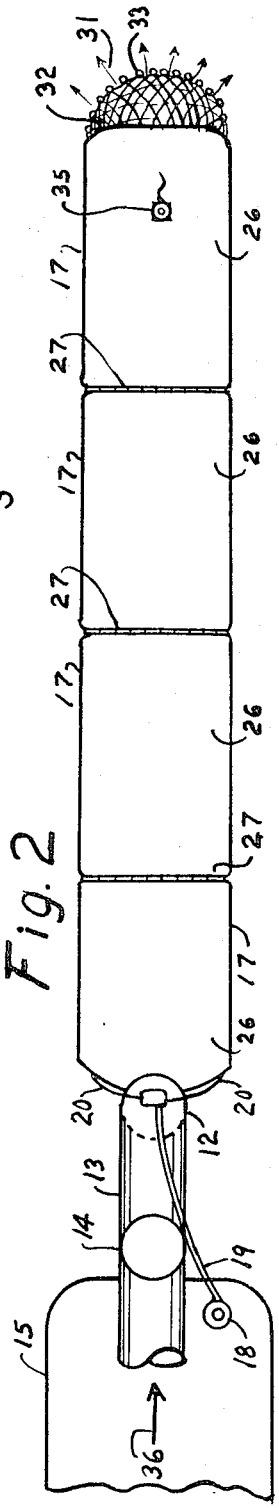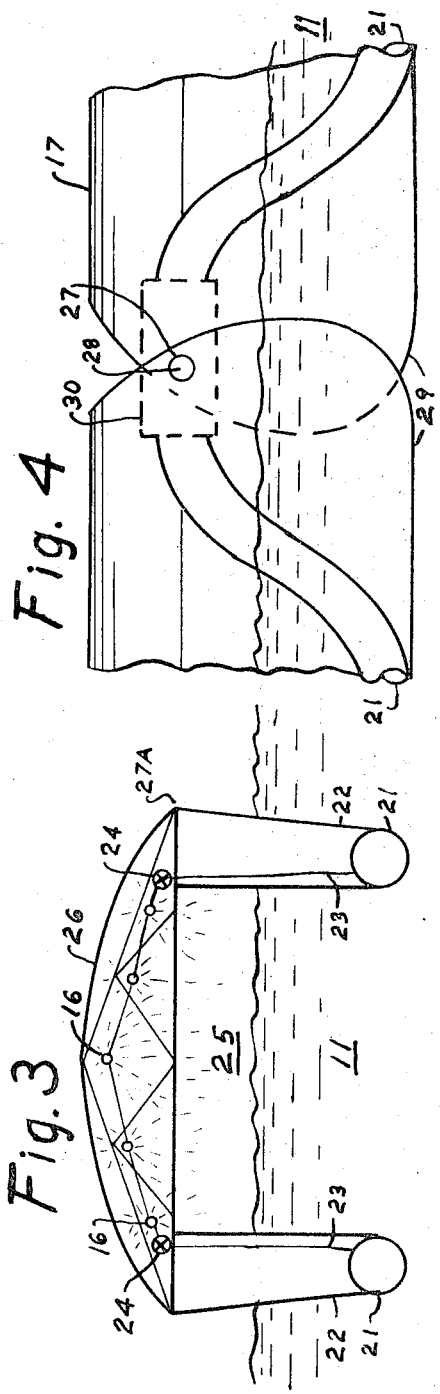

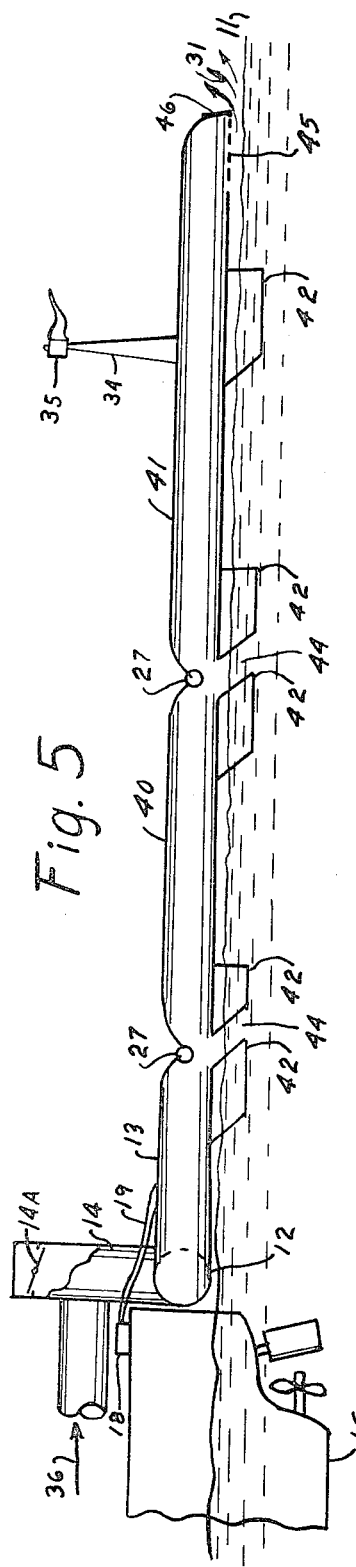
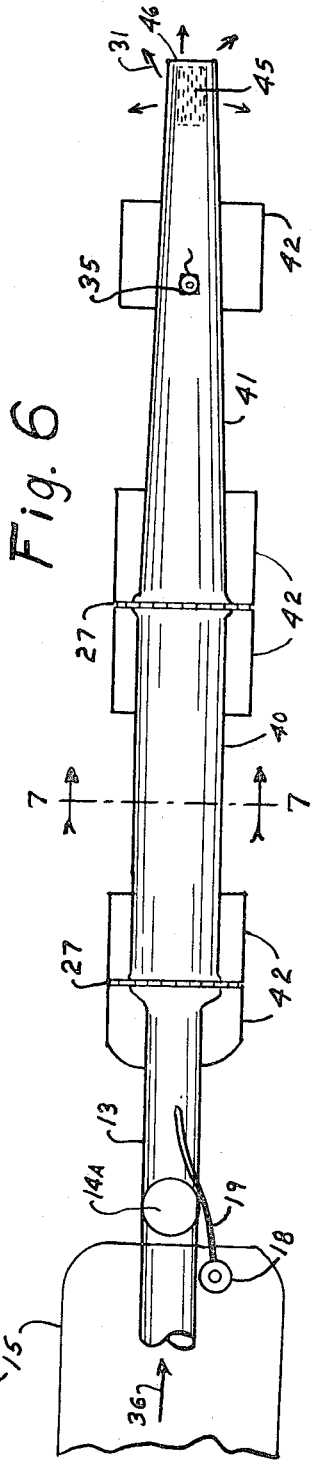
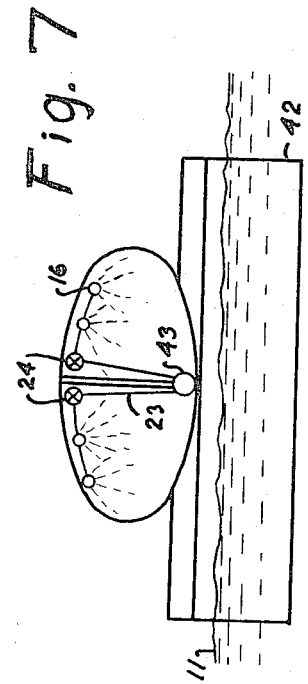

3,835,625

POLLUTION-REDUCING FLOATING EXHAUST

BACKGROUND OF THE INVENTION

This invention relates generally to the cooling, cleaning, filtering, and dispersal of waste gases produced during the operation of incinerators, refuse destructors, steam generators, and chemical processes. Most large incinerators and steam generators now utilize various forms of water spray chambers and wet scrubbers to remove particulate matter from their waste gases and to thus reduce atmospheric pollution. These chambers and scrubbers are bulky, consume large volumes of water, and usually require filtration of the process water to remove collected particles. Their arrangement and principles of operation are well understood and described in the literature. Corey, Richard C., editor Principles and Practices of Incineration; Wiley Interscience, New York, 1969, LC75-78479, gives the mathematical relationships, physical principles, and mechanical arrangements for several forms of spray washers and scrubbers.

Incinerators, and steam generators, used on ships require effective cleaning of waste gases produced during operation. Space limitations and other design considerations restrict the application and effectiveness of waste-gas cleaning equipment on shipboard.

SUMMARY OF THE INVENTION

The limitations of the prior art are partially overcome by a floating exhaust system supported by the water surface adjacent to the ship as described herein. The design includes flexible joints in the waste gas channels to permit relative motion of the ship and the floating exhaust system. The large amount of cool water available and the self-cleaning features possible are employed. Particulate matter settles directly into the supporting water, or is captured by spray droplets. Draft is supplied by the outlet pressure of the induced-draft fans such as are normally used with incinerators and steam generators.

In accordance with the present invention there is provided apparatus for cooling, cleaning, and disposing of particulate matter and soluble substances contained in waste gases. Such gases arise from the operation of steam boilers and incinerators on ships. The present invention is especially applicable for use with the rotary incinerator invention which is disclosed in a copending application Ser. No. 381,262 filed 7/20/73. This processing is carried out in an elongated structure buoyantly supported on the water and suitably connected to receive waste gases from a ship or other source.

In one example, the floating exhaust system consists of an array of sections each comprised of two parallel pontoons, which form the two sides of the gas channel and a roof section which connects the top of the two pontoons and forms the top of the gas channel. These sections are connected in sequence to form a substantially rectangular gas channel whose lower boundary is the surface of the supporting water.

Spray nozzles mounted inside this gas channel cool the structure and the waste gases, while washing out suspended particles and dissolving soluble components. Spray water, heat, and removed material returns to the supporting body of water for dispersion by natural processes. Washed and cooled gases return to the atmosphere through an outlet at the end of the waste gas channel.

Spray water is supplied through hoses by pumps located on the ship. Sections of the floating gas channel are articulated to follow the surface of the water. Various types of diverters, baffles, and screens are placed inside the gas channel in some embodiments to increase the effectiveness of the particle removal or cooling action. In a preferred embodiment the cross section of the channel is reduced as the waste gases contract in cooling. In some examples screened vents are provided along the duct to disperse portions of the waste gas.

Another embodiment of this invention is a buoyant tubular structure arranged to trail behind the ship while cleaning and exhausting waste gases. A layer of cooling water is normally present along the bottom side of the tube interior. This water sloshes against the sides of the enclosing tube as wave motion is transmitted to the tube. Articulate joints are provided to reduce stresses caused by large wave motion. A large shrouded opening to the water below is provided at each articulated joint to serve as an outlet for excess water and collected particles. The buoyant structure supporting the gas tube is arranged to support the gas tube a small distance above the water surface under normal conditions. Cooled and washed gases exit in a downward direction through a large screened opening in the lower surface of the end section of the tube. The screen over the opening is periodically washed by wave action which periodically floods the outlet. A safety pressure-relief outlet is also provided to handle unusual hydraulic surges without damage to the tube.

It is an object of the present invention to provide a method of and apparatus for cooling, cleaning, removing particulate and soluble matter from waste gases.

A further object of the present invention is to provide apparatus to cool and clean the waste gases originating on ships or floating structures by equipment flexibly connected to the ships utilizing separate means of flotation.

Another object of the present invention is to reduce the total height of ships by replacing tall exhaust stacks with horizontal floating stacks which are towed behind the ships.

A still further object of this present invention is to reduce the visibility and atmospheric pollution of incinerator ships operated in coastal waters to dispose of refuse collected from nearby cities.

The invention has as another object the provision of a separate, floating system for cooling and cleansing waste gases produced on a ship or similar floating structure.

Another object of the invention is the provision of a cooling and cleaning system for waste gases using the surface of the supporting body of water as an essential boundary and agent for removal of heat and particulate matter from waste gases.

A further object of the invention is the provision of an exhaust system which discharges waste gases downward against the water surface and in close proximity thereto.

Another object of the invention is the provision of an exhaust system which utilizes wave motion to clean filters, increase turbulence, and generally enhance the effectiveness of cleansing and cooling.

The invention has as another object the provision of an exhaust system to generate a substantial portion of the water turbulence and spray dispersion utilized for cooling and cleansing.

A further object of the invention is the provision of underwater hydrofoils to support a floating exhaust system during high speed operation.

Another object of the invention is the provision of a ship exhaust system which greatly reduces the amount of particulate fallout upon the ship.

These and other objects and features of the invention are apparent in the disclosure which includes the drawings and the specification with the foregoing and ongoing description and with the claims, which are a part of the specification.

BRIEF DESCRIPTION OF THE DRAWINGS

FIG. 1 is an elevation schematic view of a floating exhaust system connected to the stern of a ship and supported upon the surface of the water.

FIG. 2 is a schematic top plan view of a floating exhaust system trailing behind the stern of a ship.

FIG. 3 is a cross-section schematic view through one of the segments of the floating exhaust system, transverse to an elongated direction.

FIG. 4 shows additional details of a flexible joint seal, and the water pipe connections between segments of the floating exhaust system.

FIG. 5 is an elevation schematic view of a floating exhaust system with tubular channels.

FIG. 6 is a top plan schematic view of a floating exhaust system with tubular channel attached to a ship.

FIG. 7 is a partially sectioned detail view of a tubular channel floating exhaust system.

DETAILED DESCRIPTION OF THE DRAWINGS

In the drawings like elements are designated by the same reference characters. FIGS. 1, 2, 3, and 4 illustrate a floating exhaust system 10, which is buoyantly supported upon the surface of a body of water 11, and which is connected through two flexible joints 12 and an inclined tube 13 to a fixed short vertical tube 14 on the stern 15 of a ship which carries the source of the hot waste gases 36 to be cooled and cleansed. This source may be a rotary incinerator, as disclosed in a co-pending application, or the normal combustion equipment supplying energy to operate the ship. This vertical tube 14 is normally closed at the top by a valve 14A. The flexible joints 12 and tube 13 permit relative motions between the ship and the exhaust system 10 such as characteristically are produced by wind and wave forces acting upon the ship and system. The joints 12 each preferably are designed to flex ± 90° in yaw, ± 30° in roll, and ± 15° in pitch. The length of the tube 13 is sufficient to permit the exhaust system 10 to be brought alongside the ship for repairs, inspection, or emergency maneuvers.

Internal spray nozzles 16 located in the joints 12, tube 13, vertical tube 14, and all floating segments 17 cool the waste gases and wash particulate matter from them. Spray nozzles 16 are also positioned to maintain the entire surrounding structure at a safe operating temperature. An engine-driven pump 18 located on the stern 15 of the ship lifts water from the supporting body of water and supplies it to the spray nozzles 16 through a pipeline 19. Portions of said pipeline 19 are made flexible to accommodate relative motion between the stern 15 and the floating exhaust system 10. Pipeline 19 divides into two parts 20 when it reaches the first segment 17, and each of these parts 20 connects to a bottom pipe 21 located at the lower edge of each pontoon 22 of each segment 17. As shown in FIG. 3 distribution tubes 23 located in each segment 17 supply groups of spray nozzles 16 through control valves 24, which are adjusted to give the required intensity of spray inside the gas channel 25.

Each segment 17 is fitted with a roof structure 26, which supports the spray nozzles 16, and which is attached to the two pontoons 22 by a gas-tight joint 27A. This roof structure 26 also maintains the pontoons 22 upright and parallel. The roof 26 is shaped to shed water splashed upon it by waves and is constructed to allow some torsional deflection without damage. Joints 27 between segments 17 may be of the construction commonly referred to as piano-type which are secured by a hinge pin 28.

Overlapping plate skirts 29 may be used to reduce gas leakage at the joints 27 as illustrated in FIG. 4. The bottom pipes 21 are bent up to the level of the hinge pin 28 and flexibly are connected by a hose 30 to the pipe 21 of a following segment 17.

Waste gases 36 enter the substantially rectangular gas channel 25 and are cooled and cleansed by the water from the spray nozzles 16 and by direct contact with the water surface. Particulate matter in the waste gases 36 settles into the supporting body of water. The gas channel 25 is designed to be wide and low to improve stability, to reduce the required settling distance for particulate matter, and to increase the cooling area of water surface inside. The actual cross-sectional area of the gas channel 25, volume of spray water supplied, segment 17 length, and the number of segments 17 required for a given application are decided after a careful study of the composition and temperature of the incoming waste gases 36, the amount of cooling and particulate removal required, the weather conditions in the area of operation, the properties of the available materials, and the economics of a given installation.

Cooled and cleansed gases 31 exit to the atmosphere through a reinforced mesh and fabric filter 32 attached to the end of the last segment 17 as shown in FIG. 1. The lower edge of this filter 32 is attached to a line of floats 33 trailing on the surface of the water 11. Wave action keeps this filter 32 wet and washes away collected particles. Since the discharged gases 31 are cool and low, there is increased time for any remaining particles to settle into the water surface 11 after leaving the exhaust system 10. The situation is much more favorable for reducing pollution than when conventional stacks release hot waste gases containing particulate matter which is borne aloft by the buoyant gases.

The outer end segment 17 of the floating exhaust system 10 is equipped with a vertical mast 34 which carries a warning and identification package 35. This package 35 contains a radar reflector, navigation lights, distinctive pennant, and other equipment as required by international law.

Another embodiment of a floating exhaust system 10 is shown in FIGS. 5, 6, and 7. Waste gases 36 originating on a ship are conducted through a tube 13 into an articulated series of cooling and washing chambers 40, 41, which are of generally elliptical cross section as shown in FIG. 7. These chambers 40, 41 are supported a short distance above the water surface by closed pontoons or hydrofoils of appropriate size and shape. Internal spray nozzles 16 located in the joint 12, tube 13, vertical tube 14, and floating chambers 40, 41 cool the waste gases 36 and wash particulate matter from them. These spray nozzles 16 are supplied with water through pipeline 19 and valves 24 as described previously. Pipeline 19 connects to a distribution pipe 43 running longitudinally through chambers 40 and 41.

Water from the nozzles 16 and trapped particulate matter returns to the supporting body of water through open ports 44 located between the pontoons 42 and below the hinge joints 27. Waste gas 36 leakage to the atmosphere is prevented by overlapping plate skirts as illustrated previously in FIG. 4. Wave motion causes sufficient sloshing of water through the chambers 40, 41 to remove all deposits of particles. Chambers 40, 41 may include interior frame structure to increase their strength. Aluminum or other suitable low-density material may be used as desired in fabrication. The outer end of chamber 41 is equipped with a short mast 34 and a navigation package 35 as previously described.

Cooled and cleansed gases 31 exit to the atmosphere through a series of filtered openings 45 located on the underside of chamber 41 at the outermost end. A spring-loaded safety valve 46 is also located in the outermost end of chamber 41 to relieve any overpressure caused by hydraulic transients. Wave action periodically washes and flushes particulate matter from the filtered openings 45. A tapered construction is suggested for chamber 41 to reduce cost, weight, and inertia. Various baffles and obstructions may be placed in the chambers 40, 41 to direct the flow of gas and water, to increase turbulence and mixing, and generally to enhance the performance of particular designs. External water sprays may be added to maintain the outer surfaces at safe operating temperatures.

While mechanically pumped spray water is utilized in the examples illustrated this is not an essential feature of these exhaust systems when used with ships of moderate velocity. Very low heads are required to move water onto all surfaces of the exhaust system. These water heads may be developed by suitably designed scoops or ram tubes facing the direction of ship travel. A further refinement consists of the addition of underwater hydrofoils to lift the exhaust system and reduce drag during high speed operation. A still further refinement consists of the addition of a remotely steerable and powered propeller at the outer end of the floating exhaust system. This could be used to hold the system at a particular orientation with respect to the ship when the ship is stopped or moving at a low velocity. In all cases joints 27 may be replaced by universal joints such as shown at 12. In an alternate embodiment hinges 27 are alternately arranged on vertical and horizontal alignments to provide lateral as well as vertical bending.

While the invention has been described in part with reference to specific embodiments, it will be obvious to those skilled in the art that modifications and variations may be made without departing from the spirit and scope of the invention.

The scope of the invenion is defined in the following claims.

I claim:

1. A floating exhaust system comprising a source of gaseous exhaust, a conduit connected to the source for conducting exhaust from the source, a generally horizontal floating stack connected to the conduit for receiving exhaust from the conduit, support means connected to the stack for supporting the stack on a generally horizontal body of water and outlet means connected to a distal end of the stack remote from the conduit for flowing exhaust out of the stack.

2. The floating exhaust system of claim 1 further comprising a source of water pressure, a water pipe connected to the source of water pressure and connected to the conduit and stack for carrying water to the conduit and stack and spray heads mounted in the water pipe for spraying water into the exhaust chamber within the conduit and stack for washing particulate matter from the exhaust and for cooling and condensing the exhaust.

3. The floating exhaust system of claim 2 further comprising flexible water pipes interconnecting rigid water pipes between sections of the stack.

4. The floating exhaust system of claim 2 wherein the pipes are mounted in a lower position in the stack and support means for stabilizing the stack.

5. The floating exhaust system of claim 1 wherein the generally horizontal stack comprises a plurality of sections and hinges joining the sections whereby the stack adjusts to disruptions in the surface of a body on which it is supported.

6. The apparatus of claim 5 wherein the hinges are transverse to an elongated direction of the stack and are generally horizontal, and wherein the stack sections further comprise overlapping sides for preventing laterally outward flow of exhaust gases between the sections.

7. The floating exhaust system of claim 1 wherein the support means comprise elongated generally parallel floats and wherein the stack means comprises an arched cover generally interconnecting the floats, thereby forming an exhaust chamber between the cover and the floats and an open surface between the floats of the body on which the floats are supported.

8. The apparatus of claim 7 wherein the floats and cover comprise generally parallel vertical displacement portions and a roof interconnecting the portions.

9. The floating exhaust system of claim 1 wherein the stack comprises a plurality of elongated tubular sections and wherein the support means comprises individual supporting means mounted beneath the tubular sections.

10. The floating exhaust system of claim 9 wherein the individual supporting means comprises floats at ends of the sections and further comprising downward openings between tube sections intermediate the floats for permitting washing of water in and out of the sections to remove particulate material.

11. The floating exhaust system of claim 1 wherein the conduit comprises a universal joint connecting the source of exhaust and the stack, whereby the stack may be turned about the source of exhaust.

12. The floating exhaust system of claim 1 wherein the outlet means comprises an opening in the distal end with a filter in the opening and means to wash the filter.

13. The apparatus of claim 12 wherein the opening is downward pointing.

14. The apparatus of claim 12 further comprising pressure release means at the distal end of the stack for releasing excessive fluid pressure within the stack.

* * * * *